United States Patent [19]

Nishiyama et al.

[11] Patent Number: 4,943,651
[45] Date of Patent: Jul. 24, 1990

[54] NOVEL SUBSTITUED NAPHTHALENE COMPOUNDS AND LIQUID CRYSTAL COMPOSITIONS CONTAINING SAME

[75] Inventors: Shinichi Nishiyama; Hideo Yamaoka; Tooru Yamanaka; Tohru Yamada, all of Ichihara, Japan

[73] Assignee: Mitsui Petrochemical Industries, Ltd., Tokyo, Japan

[21] Appl. No.: 318,560

[22] Filed: Mar. 3, 1989

[30] Foreign Application Priority Data

Mar. 7, 1988 [JP] Japan .................................. 63-54430
Mar. 7, 1988 [JP] Japan .................................. 63-54431

[51] Int. Cl.$^5$ ............................................. C07C 69/76
[52] U.S. Cl. ................................. 560/56; 252/299.62
[58] Field of Search ......................................... 560/56

[56] References Cited

U.S. PATENT DOCUMENTS 4,680,137 7/1987 Isoyama et al. ...................... 560/56

FOREIGN PATENT DOCUMENTS

87/06577 11/1987 World Int. Prop. O. .

*Primary Examiner*—Paul J. Killos
*Attorney, Agent, or Firm*—Nixon & Vanderhye

[57] ABSTRACT

In accordance with the present invention, there is provided substituted naphthalene compounds represented by the following formula [I].

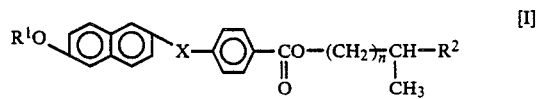

wherein $R^1$ represents alkyl of 1–18 carbon atoms, $R^2$ represents alkyl of 1–18 carbon atoms, X is a group represented by $-OCH_2-$ or $-CH_2CH_2-$, and n is 0 or 1.

In accordance with the invention, moreover, there is provided liquid crystal compositions containing the substituted naphthalene compounds represented by the above-mentioned formula [I].

4 Claims, 2 Drawing Sheets

NOVEL SUBSTITUTED NAPHTHALENE COMPOUNDS AND LIQUID CRYSTAL COMPOSITIONS CONTAINING SAME

FIELD OF THE INVENTION

This invention relates to novel substituted naphthalene compounds and more particularly to novel substituted naphthalene compounds which are highly useful as ferroelectric liquid crystal substances.

In another aspect, the invention relates to liquid crystal compositions containing substituted naphthalene compounds typified by such novel substituted naphthalene compounds as referred to above.

BACKGROUND OF THE INVENTION

CRT devices have heretofore been used most widely as display devices of office appliances.

In the field of appliances such as office appliances having display devices, there is an increasing demand in recent years for miniature and weight saving appliances or large-frame and light gage display devices. On that account, in place of conventional CRT devices, various new type display devices have been developed with the view of answering to uses thereof or demands therefor. For instance, display devices of the kind include liquid crystal display, plasma display, LED display, EL display and ECD display.

Of these display devices mentioned above, liquid crystal display basically has such a function that electrical signals are given to switching elements using therein a liquid crystal compound, wherein the liquid crystal compound present in said switching elements is changed in its state, thereby to control the shielding and transmission of light and develop the electrical signals on the display device. Such liquid crystal display device as illustrated above has already been put to practical use not only as a display device of the aforementioned office appliances but also as a display device of digital watch or portable game and, at the same time, has come to be used recently as a display device of moving picture such as small-sized television.

In the above-mentioned display devices using liquid crystal compounds, various driving methods are already known. For example, as the driving method of liquid crystal display presently used, there is TN (twisted nematic) mode. This TN mode is to carry out display by utilization of dielectric anisotropy of the molecule in the nematic phase of the liquid crystal compound, wherein the display device drives by energy proportional to the square of the electrical field applied from outside ($f \alpha E^2$).

In the switching elements of liquid crystal display adopting this TN mode, however, there is involved such problems that in order to change the image being displayed, the driving time is prolonged, because the position of the molecule of the liquid crystal compound must be changed, and also the voltage necessary for changing the position of the molecule of the liquid crystal compound, that is, the electric power consumption, becomes large. In such switching elements as mentioned above, there is such a problem that because the switching threshold value characteristics of the element are not so good, when the position of the molecule of the liquid crystal compound is changed at high speed and the change-over operation is intended to carry out, whereby a lack voltage may exert even on those portions of the image which are not displayed and a contrast of the display device may markedly decrease.

Because of the above-mentioned problems associated with the conventional display method relying on TN mode as mentioned above, the display devices utilizing TN mode are not suitable particularly for large frame display devices or display devices for moving picture such as small-sized digital televisions.

Furthermore, there are being used display devices utilizing STN (super twisted nematic) mode in which the switching threshold value characteristics and the like as attained in the above-mentioned TN mode have been improved. By virtue of utilization of such STN mode, a contrast of the display devices certainly improves because of the improved threshold value characteristics. However, this display method is identical with the method utilizing TN mode in that both methods utilize the dielectric anisotropy, and accordingly because of their long switching time, the display devices utilizing this STN mode do not have sufficient characteristics as required for large frame display devices or devices for moving picture such as small-sized digital television.

In contrast thereto, R. B. Meyer et al. suggested in 1975 that organic compounds synthesized by them exhibit ferroelectric properties, and further suggested in 1980 the possibility that by filling cells having a small gap with these ferroelectric liquid crystal compounds, said ferroelectric liquid compounds as filled may be used as opticalswitching elements, i.e. display devices.

In distinction to switching elements utilizing TN mode or STN mode, the switching elements using such ferroelectric liquid crystal compounds as mentioned above are able to function as switching elements only by changing the direction of molecular orientation of said liquid crystal compounds and hence the switching time required for operating the switching elements is markedly shortened. Further, because a value of $Ps \times E$ obtained from a spontaneous polarization (Ps) of the ferroelectric liquid crystal compound and a strength of the electric field (E) applied is an effective energy output for changing the direction of molecular orientation of said liquid crystal compound, electric power consumption required therefor can be markedly minimized. Such ferroelectric liquid crystal compounds as mentioned above are suitable particularly as display devices for large frame or moving picture, because they have two steady states depending upon the direction of electric field applied, that is bistability and also very favorable switching threshold value characteristics.

When these ferrroelectric liquid crystal compounds are intended to use in optical switching elements, they are required to have such characteristics as an operating temperature range in the vicinity of ordinary temperature (room temperature), a wide operating temperature zone, a high switching speed and an appropriate switching threshold value voltage. Particularly, of these characteristics, the operating temperature range is especially important when the ferroelectric liquid crystal compounds are used in optical switching elements, and there are many ferroelectric liquid crystal compounds which are unusable therefor, because their operating temperature range does not agree with their service temperature range, in spite of the fact that other characteristics of said compounds are excellent (refer, for example, to R. B. Meyer et al., J. de Phys., Vol. 36 L, p. 69 (1975)).

Further, ferroelectric liquid crystal compounds having a naphthalene ring and the like compounds are disclosed, for example, in M. Taguchi and T. Harada, "Proceedings of Eleventh Conference on Liquid Crystal," p. 168 (1985) and Japanese Patent L-O-P Publn. No. 10045/1987. The liquid crystal compounds disclosed therein are of relatively high practical use when viewed from the standpoint of their operating temperature range and the like, for example, the compounds are stable as a substituent is attached directly to the naphthalene ring via ester bond. However, it is hard to say that these liquid crystal compounds satisfy all the characteristics other than the operating temperature range. Thus, there was much room for improvement.

Although the foregoing is a basic illustration of excellent characteristics such as chemical stability and the like as required for the ferroelectric liquid compounds, such is also the case with substituted naphthalene compounds even when they are used for other purposes.

OBJECT OF THE INVENTION

An object of the present invention is to provide novel substituted naphthalene compounds which are highly useful, in particular, as ferroelectric liquid crystal compounds.

A further object of the invention is to provide liquid crystal compositions which contain substituted naphthalene compounds as typified by the above-mentioned novel substituted naphthalene compounds and have such excellent characteristics as an operating temperature range in the vicinity of ordinary temperature (room temperature), a wide operating temperature zone, a high switching speed and an appropriate switching threshold voltage.

SUMMARY OF THE INVENTION

The substituted naphthalene compounds of the present invention are represented by the following formula [I].

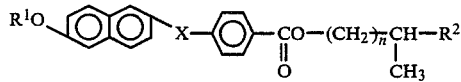

wherein $R^1$ represents alkyl of 1-18 carbon atoms and $R^2$ represents alkyl of 1-18 carbon atoms, X is the group represented by —OCH$_2$— or —CH$_2$CH$_2$—, and n is 0 or 1.

Of the substituted naphthalene compounds of the formula mentioned above, those having particularly alkyl of 2 or more carbon atoms as $R^2$ are effectively usable as liquid crystal compounds.

The liquid crystal compositions of the present invention contain substituted naphthalene compounds represented by the following formula [IV].

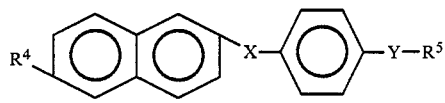

wherein $R^4$ represents alkyl or alkoxy, $R^5$ represent an optically active group, X represents a divalent group selected from the group consisting of —O—COO—, —CO—, —OCH$_2$—, —CH$_2$O—, —CH$_2$CH$_2$— and —O—CO—COO—, and Y represents a divalent group selected from the group consisting of —COO—, —O—, —O—CO— and —CO—.

By virtue of containing the liquid crystal compounds represented by the above-mentioned formula [IV], the liquid crystal compositions of the invention have markedly excellent characteristics.

DETAILED DESCRIPTION OF THE INVENTION

Figure 1:
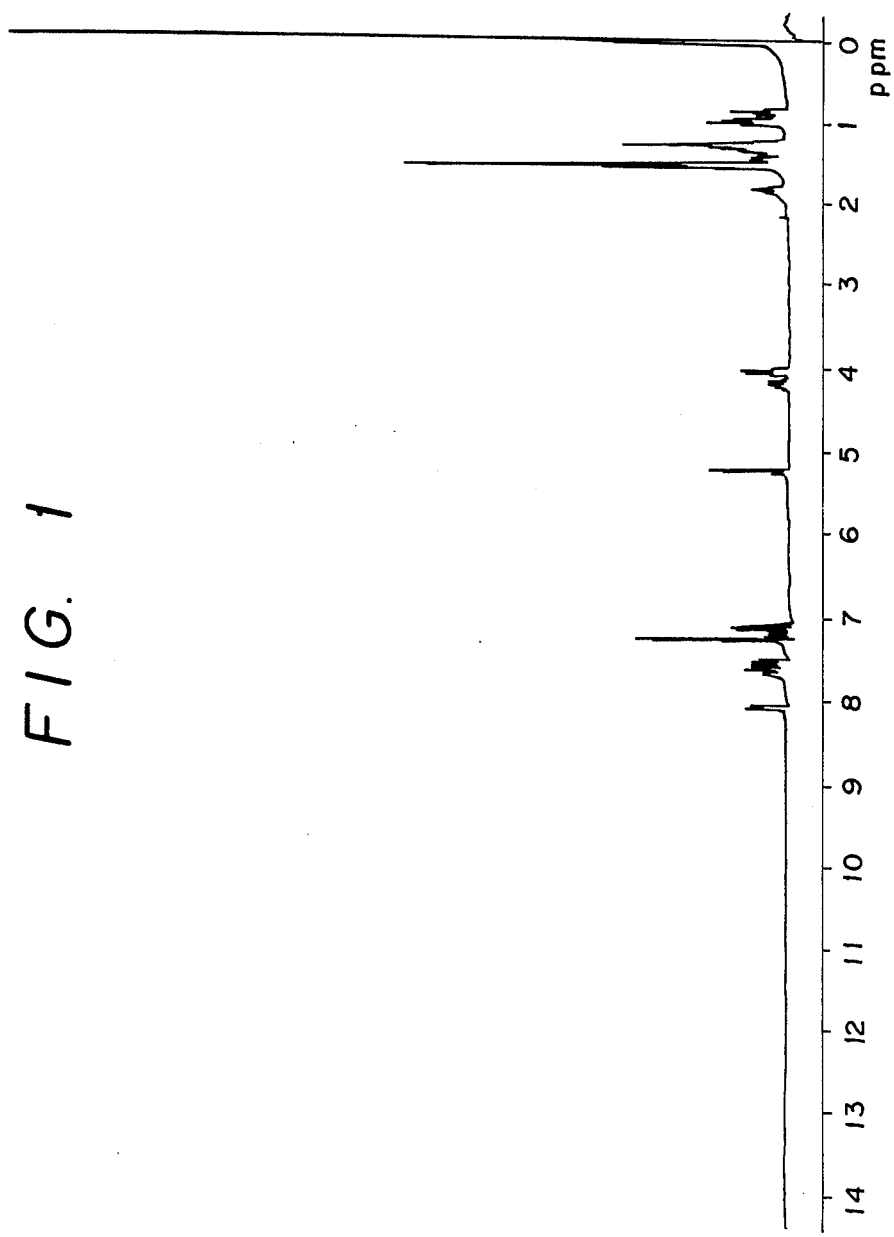
FIG. 1 is a chart showing $^1$H-NMR spectrum of 2-[4'-(R-2''-methylbutyloxycarbonyl)phenylmethyloxy]-6-decyloxynaphthalene.

The substituted naphthalene compounds of the present invention are illustrated below in detail.

The present substituted naphthalene compounds may be represented by the following formula [I].

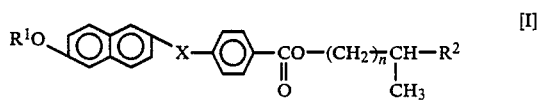

In the above formula [I], $R^1$ represents alkyl of 1-18 carbon atoms, and particularly $R^1$ is preferably alkyl of 6-16 carbon atoms.

In the above formula [I], $R^2$ represents alkyl of 1-18 carbon atoms, preferably alkyl of 1-7 carbon atoms.

In the above formula [I], X is the group represented by —OCH$_2$— or —CH$_2$CH$_2$—.

In the above formula [I], n is 0 or 1.

Furthermore, the present substituted naphthalene of the above formula [I], in which $R^2$ is alkyl of two or more carbon atoms, are preferably compounds having optically active carbons represented by the following formula [II]. Such compounds as being represented by the following formula [II] are high in effectiveness particularly as liquid crystal compounds.

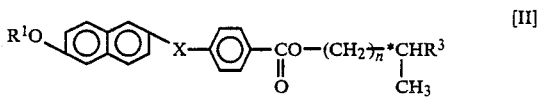

In the above formula [II], $R^1$ represents alkyl of 1-18 carbon atoms, and particularly $R^1$ is preferably alkyl of 6-16 carbon atoms. Further, $R^1$ mentioned above is preferably straight chain alkyl of 8-12 carbon atoms when the compounds of the above formula [II] are used as liquid crystal substances.

$R^3$ in the above formula [II] represents alkyl of 2-18 carbon atoms, and particularly $R^3$ is preferably alkyl of 2-8 carbon atoms. Further, $R^3$ is preferably ethyl or hexyl when the compounds of the formula [II] are used as liquid crystal substances. Furthermore, when $R^3$ mentioned above is ethyl, n in the above formula [II] is preferably 1, and when said $R^3$ is hexyl, n is preferably 0.

Further, in the formula [II] mentioned above, X is the group represented by —OCH$_2$— or —CH$_2$CH$_2$—.

Accordingly, the substituted naphthalene compounds of the present invention as illustrated above may roughly be divided according to the kind of the substituent X into compounds represented by the following formula [I-a], [II-a], and [III-a], and those represented by the following formulas [I-b], [II-b] and [III-b].

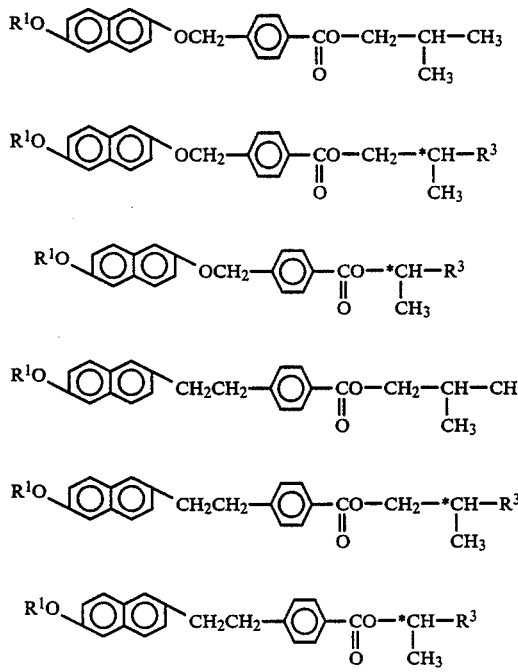

In the above formulas [I-a], [II-a] and [III-a] and also [I-b], [II-b] and [III-b], $R^1$ and $R^3$ are as defined in the aforementioned formula [I].

Of the compounds represented by the above-mentioned formulas [I-a], [II-a], [III-a], [I-b], [II-b] and [III-b], examples of those which are particularly high in effectiveness are as listed below.

2-[4'-(R-2''-methylpropyloxycarbonyl)phenylmethyloxy]-6-decyloxynaphthalene,
2-[2'-{4''-(R-2'''-methylpropyloxycarbonyl)phenyl}ethyl]-6-decyloxynaphthalene,
2-[4'-(R-2''-methylbutyloxycarbonyl)phenylmethyloxy]-6-decyloxynaphthalene,
2-[4'-(R-2''-methylpentyloxycarbonyl)phenylmethyloxy]-6-decyloxynaphthalene,
2-[4'-(R-2''-methylheptyloxycarbonyl)phenylmethyloxy]-6-decyloxynaphthalene,
2-[4'-(R-2''-methyloctyloxycarbonyl)phenylmethyloxy]-6-decyloxynaphthalene,
2-[4'-(R-2''-methylnonyloxycarbonyl)phenylmethyloxy]-6-decyloxynaphthalene,
2-[4'-(R-2''-methylbutyloxycarbonyl)phenylmethyloxy]-6-pentyloxynaphthalene,
2-[4'-(R-2''-methylbutyloxycarbonyl)phenylmethyloxy]-6-hexyloxynaphthalene,
2-[4'-(R-2''-methylbutyloxycarbonyl)phenylmethyloxy]-6-heptylmethyloxynaphthalene,
2-[4'-(R-2''-methylbutyloxycarbonyl)phenylmethyloxy]-6-octyloxynaphthalene,
2-[4'-(R-2''-methylbutyloxycarbonyl)phenylmethyloxy]-6-nonyloxynaphthalene,
2-[4'-(R-2''-methylbutyloxycarbonyl)phenylmethyloxy]-6-undecyloxynaphthalene,
2-[4'-(R-2''-methylbutyloxycarbonyl)phenylmethyloxy]-6-dodecyloxynaphthalene,
2-[4'-(R-2''-methylbutyloxycarbonyl)phenylmethyloxy]-6-tridecyloxynaphthalene,
2-[4'-(R-2'''-methylbutyloxycarbonyl)phenylmethyloxy]-6-tetradecyloxynaphthalene,
2-[4'-(R-2''-methylbutyloxycarbonyl)phenylmethyloxy]-6-pentadecyloxynaphthalene,
2-[4'-(R-2''-methylbutyloxycarbonyl)phenylmethyloxy]-6-hexadecyloxynaphthalene,
2-[4'-(R-2''-methylbutyloxycarbonyl)phenylmethyloxy]-6-heptadecyloxynaphthalene,
2-[4'-(R-2''-methylbutyloxycarbonyl)phenylmethyloxy]-6-octadecyloxynaphthalene,
2-[4'-(R-1''-methylheptyloxycarbonyl)phenylmethyloxy]-6-pentyloxynaphthalene,
2-[4'-(R-1''-methylheptyloxycarbonyl)phenylmethyloxy]-6-hexyloxynaphthalene,
2-[4'-(R-1''-methylheptyloxycarbonyl)phenylmethyloxy]-6-heptyloxynaphthalene,
2-[4'-(R-1''-methylheptyloxycarbonyl)phenylmethyloxy]-6-octyloxynaphthalene,
2-[4'-(R-1''-methylheptyloxycarbonyl)phenylmethyloxy]-6-nonyloxynaphthalene,
2-[4'-(R-1''-methylheptyloxycarbonyl)phenylmethyloxy]-6-undecyloxynaphthalene,
2-[4'-(R-1''-methylheptyloxycarbonyl)phenylmethyloxy]-6-dodecyloxynaphthalene,
2-[4'-(R-1''-methylheptyloxycarbonyl)phenylmethyloxy]-6-tridecyloxynaphthalene,
2-[4''-(R-1''-methylheptyloxycarbonyl)phenylmethyloxy]-6-tetradecyloxynaphthalene,
2-[4'-(R-1''-methylheptyloxycarbonyl)phenylmethyloxy]-6-pentadecyloxynaphthalene,
2-[4'-(R-1''-methylheptyloxycarbonyl)phenylmethyloxy]-6-hexadecyloxynaphthalene,
2-[4'-(R-1''-methylheptyloxycarbonyl)phenylmethyloxy]-6-heptadecyloxynaphthalene,
2-[4'-(R-1''-methylheptyloxycarbonyl)phenylmethyloxy]-6-octadecyloxynaphthalene,
2-[2'-{4''-(R-2'''-methylbutyloxycarbonyl)phenyl}ethyl]-6-decyloxynaphthalene,
2-[2'-{4''-(R-2'''-methylbutyloxycarbonyl)phenyl}ethyl]-6-decyloxynaphthalene,
2-[2'-{4''-(R-2'''-methylpentyloxycarbonyl)phenyl}ethyl]-6-decyloxynaphthalene,
2-[2'-{4''-(R-2'''-methylhexyloxycarbonyl)phenyl}ethyl]-6-decyloxynaphthalene,
2-[2'-{4''-(R-2'''-methylheptyloxycarbonyl)phenyl}ethyl]-6-decyloxynaphthalene,
2-[2'-{4''-(R-2'''-methylocytloxycarbonyl)phenyl}ethyl]-6-decyloxynaphlalene,
2-[2'-{4''-(R-2'''-methylnonyloxycarbonyl)phenyl}ethyl]-6-decyloxynaphthalene,
2-[2'-{4''-(R-2'''-methylbutyloxycarbonyl)phenyl]ethyl]-6-pentyloxynaphthalene,
2-[2'-{4''-(R-2'''-methylbutyloxycarbonyl)phenyl}ethyl]-6-hexyloxynaphthalene,
2-[2'-{4''-(R-2'''-methylbutyloxycarbonyl)phenyl}ethyl]-6-heptyloxynaphthalene,
2-[2'-{4''-(R-2'''-methylbutyloxycarbonyl)phenyl}ethyl]-6-octyloxynaphthalene,
2-[2'-{4''-(R-2'''-methylbutyloxycarbonyl)phenyl}ethyl]-6-nonyloxynaphthalene,
2-[2'-{4''-(R-2'''-methylbutyloxycarbonyl)phenyl}ethyl]-6-undecyloxynaphthalene,
2-[2'-{4''-(R-2'''-methylbutylcarbonyl)phenyl}ethyl]-6-dodecyloxynaphthalene,
2-[2'-{4''-(R-2'''-methylbutyloxycarbonyl)phenyl}ethyl]-6-tridecyloxynaphthalene,
2-[2'-{4''-(R-2'''-methylbutyloxycarbonyl)phenyl}ethyl]-6-tetradecyloxynaphthalene,
2-[2'-{4''-(R-2'''-methylbutyloxycarbonyl)phenyl}ethyl]-6-pentadecyloxynaphthalene, 2-[2'-{4''-(R-2'''-methylbutyloxycarbonyl)phenyl}ethyl]-6-hexadecyloxynaphthalene,
2-[2'-{4''-(R-2'''-methylbutyloxycarbonyl)phenyl}ethyl]-6-heptadecyloxynaphthalene,
2-[2'-{4''-(R-2'''-methylbutyloxycarbonyl)phenyl}ethyl]-6-octadecyloxynaphthalene,
2-[2'-{4''-(R-1'''-methylheptyloxycarbonyl)phenyl}ethyl]-6-hexyloxynaphthalene,
2-[2'-{4''-(R-1'''-methylheptyloxycarbonyl)phenyl}ethyl]-6-heptyloxynaphthalene,
2-[2'-{4''-(R-1'''-methylheptyloxycarbonyl)phenyl}ethyl]-6-octyloxynaphthalene,
2-[2'-{4''-(R-1'''-methylheptyloxycarbonyl)phenyl}ethyl]-6-nonyloxynaphthalene,
2-[2'-{4''-(R-1'''-methylheptyloxycarbonyl)phenyl}ethyl]-6-decyloxynaphthalene,
2-[2'-{4''-(R-1'''-methylheptyloxycarbonyl)phenyl}ethyl]-6-undecyloxynaphthalene,
2-[2'-{4''-(R-1'''-methylheptyloxycarbonyl)phenyl}ethyl]-6-dodecyloxynaphthalene,
2-[2'-{4''-(R-1'''-methylheptyloxycarbonyl)phenyl}ethyl]-6-tridecyloxynaphthalene,
2-[2'-{4''-(R-1'''-methylheptyloxycarbonyl)phenyl}ethyl]-6-tetradecyloxynaphthalene,
2-[2'-{4''-(R-1'''-methylheptyloxycarbonyl)phenyl}ethyl]-6-pentadecyloxynaphthalene,
2-[2'-{4''-(R-1'''-methylheptyloxycarbonyl)phenyl}ethyl]-6-hexadecyloxynaphthalene,
2-[2'-{4''-(R-1'''-methylheptyloxycarbonyl)phenyl}ethyl]-6-heptadecyloxynaphthalene, and
2-[2'-{4''-(R-1'''-methylheptyloxycarbonyl)phenyl}ethyl]-6-octadecyloxynaphthalene.

Processes for the synthesis of the substituted naphthalene compounds of the present invention are illustrated in detail hereinafter.

Of the present substituted naphthalene compounds, those represented by the formula [I-a] [II-a] or [III-a] may be prepared by the following procedure.

First, an ester compound having an alkyl group corresponding to $R^2$ is prepared in the usual way by reaction of 4-halogenated methyl benzoic acid with such alcohol capable of forming optically active carbons as R-2-methylbutanol or R-1-methylheptanol.

Separately, 2-alkyloxy-6-hydroxynaphthalene having an alkyl group corresponding to $R^1$ is prepared by alkylation of one of the hydroxyl groups of 2,6-dihydroxylnaphthalene.

Subsequently, by reacting the above-mentioned ester compound with the above-mentioned 2-alkyloxy-6-hydroxynaphthalene, there is obtained a compound represented by the formula [II-a] or [III-a] can be obtained.

Furthermore, the compounds represented by the formula [I-a] may be prepared by the same procedure as above but using, for example, 2-methylpropanol in place of the R-2-methylbutanol.

The compounds represented by the formula [II-b] or [III-b] may be prepared in the following manner. 6-Alkyloxy-2-carboxynaphthalene having an alkyl group corresponding to $R^1$ prepared in accordance with the common procedure is reduced with a reducing agent such as lithium aluminum hydride to obtain 6-alkyloxy-2-hydroxymethylnaphthalene, and this 6-alkyloxy-2-hydroxymethylnaphthalene is oxidized with an oxidizing agent such as activated manganese dioxide to obtain 2-alkyloxy-6-formylnaphthalene.

Separately, methyl(4-bromomethylbenzoate) formed by reaction of p-bromomethyl benzoic acid with methanol is reacted with triphenyl phosphine to obtain (4-methyloxycarbonyl)phenylmethylphosphonium bromide.

This (4-methyloxycarbonyl)phenylmethylphosphonium bromide is reacted with the above-mentioned 2-alkyloxy-6-formylnaphthalene to obtain 2-[2'-4''-(methyloxycarbonylphenyl)ethenyl]-6-alkyloxynaphthalene. This compound obtained is reduced with hydrogen gas in the presence of reduction catalyst such as palladium catalyst to obtain 2-[2'-4''-(methyloxycarbonylphenyl)ethyl]-6-alkyloxynaphthalene. This naphthalene compound obtained is reacted branched alcohol such as R-2-methylbutanol or R-1-methylheptanol having an alkyl group corresponding to $R^2$ to obtain a compound represented by the formula [II-b] or [III-b].

Furthermore, the compounds represented by the formula [I-b] may be prepared by the same procedure as above but using, for example, 2-methylpropanol in place of the R-2-methylbutanol.

Because the substituted naphthalene compounds of the present invention have in the molecule a naphthalene ring and a phenylene ring, both ring being bonded to each other by a specific group, a core portion of the molecule comes to have stiffness properties to a certain degree and, at the same time, cohesive energy of the molecule is small. Accordingly, of the substituted naphthalene compounds, particularly those having optically active carbon assume a smectic phase, especially a smectic C phase at a temperature in the vicinity of room temperature, and these compounds often have a value (Ps) and a viscosity coefficient at the smectic C phase, both values being deemed appropriate as those of ferroelectric liquid crystal compounds. Therefore, the present substituted naphthalene compounds as illustrated above are favorably usable, in particular, as ferroelectric liquid crystal compound.

The substituted naphthalene compounds of the present invention are usable as ferroelectric liquid crystal compounds as mentioned above and they are also usable as intermediates for other purposes such as medicines or agricultural chemicals.

The present substituted naphthalene compounds mentioned above may be used, for example, as liquid crystal compounds.

The substituted naphthalene compounds of the invention include those having optically active carbon, and such compounds often have a smectic layer at a temperature in the vicinity of room temperature. Accordingly, such substituted naphthalene compounds are of high usefulness, in particular, as ferroelectric liquid crystal substances.

Further, the present substituted naphthalene compounds are high in chemical stability such as resistance to hydrolysis and the like, because the substituent is not bonded directly to the naphthalene ring via ester bond.

The liquid crystal compositions of the present invention are illustrated in detail hereinafter.

The present liquid crystal compositions contain compounds represented by the following formula [IV].

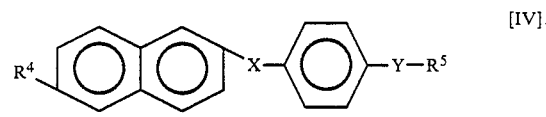

In the above formula [IV], $R^4$ represents alkyl or alkoxy, and particularly $R^4$ is alkyl or alkoxy of 1-18 carbon atoms, more preferably 6-16 carbon atoms. In many cases, the compounds of the formula [IV] exhibit favorable characteristics when they have alkoxy as $R^4$.

Further, $R^5$ represents an optically active group, and in the present invention, this $R^5$ is preferably a group of the formulae

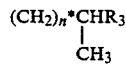

where $R^3$ and n are as defined before, particularly 2-methylbutyl or 1-methylheptyl.

Furthermore, in the formula [IV], X as a divalent group bonding the naphthalene ring to the phenylene ring is selected from the group consisting of —O—, —COO—, —CO—, —OCH$_2$—, —CH$_2$O—, —CH$_2$CH$_2$— and —O—CO—COO—.

Of these groups mentioned above, X is selected preferably from among —OCH$_2$— and —CH$_2$CH$_2$— when taking into account characteristics of the compound such as stability between the molecules and cohesive energy.

In the formula [IV], the group Y bonding the optically active group to the phenylene ring is a divalent group selected from the group consisting of —COO—, —O—, —O—CO— and —CO—.

Further, in the present invention, this Y, in particular, is preferably —COO—.

Accordingly, the present liquid crystal compositions may contain liquid crystal compounds represented by the following formulas [1]-[24], wherein $R^4$ and $R^5$ are as defined in the foregoing formula [IV].

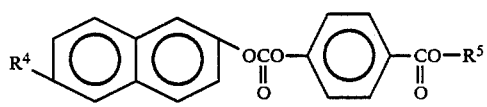
[1]

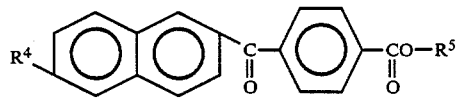
[2]

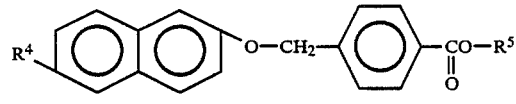
[3]

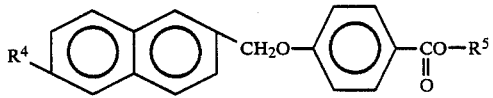
[4]

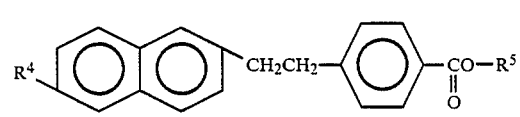
[5]

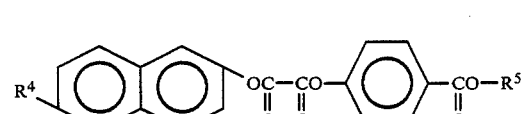
[6]

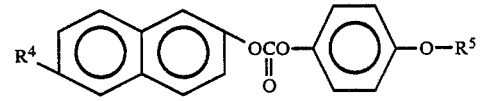
[7]

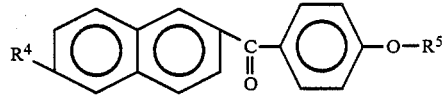
[8]

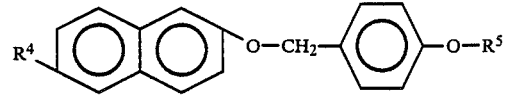
[9]

[10]

[11]

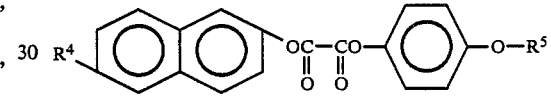
[12]

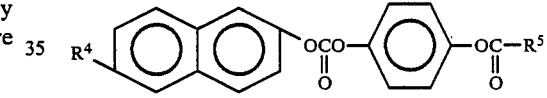
[13]

[14]

[15]

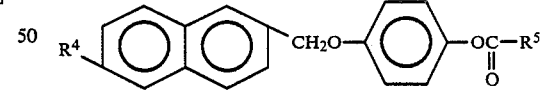
[16]

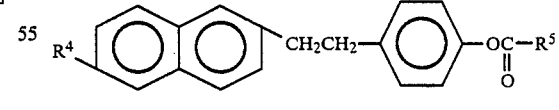
[17]

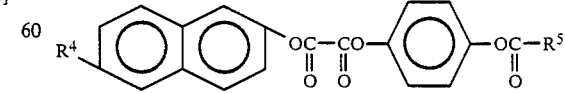
[18]

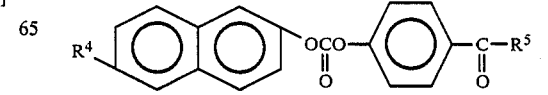
[19]

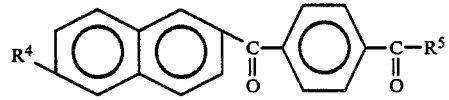
[20]

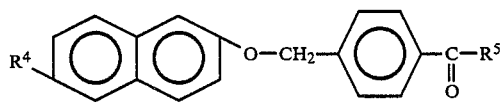
[21]

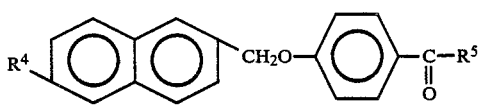
[22]

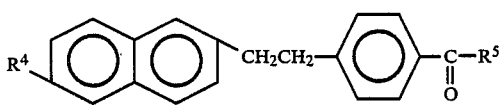
[23]

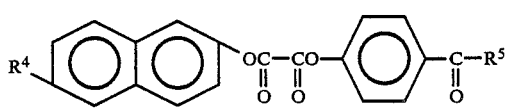
[24]

Of the compounds as represented by the above formulas, particularly preferred are compounds represented by the formulas [3] and [5]. Examples of the particularly preferred compounds used in the present invention are indicated below.

That is, of the compounds represented by the formula [3], concrete examples of preferred compounds may be listed below.

2-[4'-(R-2''-methylbutyloxycarbonyl)phenylmethyloxy]-6-decylnaphthalene,

2-[4'-(R-2''-methylpentyloxycarbonyl)phenylmethyloxy]-6-decyloxynaphthalene,

2-[4'-(R-2''-methylheptyloxycarbonyl)phenylmethyloxy]-6-decyloxynaphthalene, 2-[4'-(R-2''-methylocylyoxycarbonyl)phenylmethyloxy]-6-decyloxynaphthalene, 2-[4'-(R-2''-methylnonyloxycarbonyl)phenylmethyloxy]-6-decyloxynaphthalene, 2-[4'-(R-2''-methylbutyloxycarbonyl)phenylmethyloxy]-6-pentyloxynaphthalene, 2-[4'-(R-2''-methylbutyloxycarbonyl)phenylmethyloxy]-6-hexyloxynaphthalene, 2-[4'-(R-2''-methylbutyloxycarbonyl)phenylmethyloxy]-6-heptyloxynaphthalene, 2-[4'-(R-2''-methylbutyloxycarbonyl)phenylmethyloxy]-6-octyloxynaphthalene, 2-[4'-(R-2''-methylbutyloxycarbonyl)phenylmethyloxy]-6-nonyloxynaphthalene, 2-[4'-(R-2''-methylbutyloxycarbonyl)phenylmethyloxy]-6-undecyloxynaphthalene, 2-[4'-(R-2''-methylbutyloxycarbonyl)phenylmethyloxy]-6-dodecyloxynaphthalene, 2-[4'-(R-2''-methylbutyloxycarbonyl)phenylmethyloxy]-6-tridecyloxynaphthalene, 2-[4'-(R-2''-methylbutyloxycarbonyl)phenylmethyloxy]-6-tetradecyloxynaphthalene, 2-[4'-(R-2''-methylbutyloxycarbonyl)phenylmethyloxy]-6-pentadecyloxynaphthalene, 2-[4'-(R-2''-methylbutyloxycarbonyl)phenylmethyloxy]-6-hexadecyloxynaphthalene, 2-[4'-(R-2''-methylbutyloxycarbonyl)phenylmethyloxy]-6-heptadecyloxynaphthalene, 2-[4'-(R-2''-methylbutyloxycarbonyl)phenylmethyloxy]-6-octadecyloxynaphthalene, 2-[4'-(R-1''-methylheptyloxycarbonyl)phenylmethyloxy]-6-pentyloxynaphthalene, 2-[4'-(R-1''-methylheptyloxycarbonyl)phenylmethyloxy]-6-hexyloxynaphthalene, 2-[4'-(R-1''-methylheptyloxycarbonyl)phenylmethyloxy]-6-heptyloxynaphthalene, 2-[4'-(R-1''-methylheptyloxycarbonyl)phenylmethyloxy]-6-octyloxynaphthalene, 2-[4'-(R-1''-methylheptyloxycarbonyl)phenylmethyloxy]-6-nonyloxynaphthalene, 2-[4'-(R-1''-methylheptyloxycarbonyl)phenylmethyloxy]-6-undecyloxynaphthalene, 2-[4'-(R-1''-methylheptyloxycarbonyl)phenylmethyloxy]-6-dodecyloxynaphthalene, 2-[4'-(R-1''-methylheptyloxycarbonyl)phenylmethyloxy]-6-tridecyloxynaphthalene, 2-[4'-(R-1''-methylheptyloxycarbonyl)phenylmethyloxy]-6-tetradecyloxynaphthalene, 2-[4'-(R-1''-methylheptyloxycarbonyl)phenylmethyloxy]-6-pentadecyloxynaphthalene, 2-[4'-(R-1''-methylheptyloxycarbonyl)phenylmethyloxy]- 6-hexadecyloxynaphthalene, 2-[4'-(R-1''-methylheptyloxycarbonyl)phenylmethyloxy]-6-heptadecylnaphthalene, and 2-[4'-(R-1''-methylheptyloxycarbonyl)phenylmethyloxy]-6-octadecyloxynaphthalene.

Furthermore, of the compounds represented by the formula [5], examples of particularly preferred compounds may be those listed below.

2-[2'-{4''-(R-2'''-methylbutyloxycarbonyl)phenyl}ethyl]-6-decyloxynaphthalene,

2-[2'-{4''-(R-2'''-methylpentyloxycarbonyl)phenyl}ethyl]-6-decyloxynaphthalene,

2-[2'-{4''-(R-2'''-methylhexyloxycarbonyl)phenyl}ethyl]-6-decyloxynaphthalene,

2-[2'-{4''-(R-2'''-methylheptyloxycarbonyl)phenyl}ethyl]-6-decyloxynaphthalene,

2-[2'-{4''-(R-2'''-methyloctyloxycarbonyl)phenyl}ethyl]-6-decyloxynaphthalene,

2-[2'-{4''-(R-2'''-methylnonylcarbonyl)phenyl}ethyl]-6-decyloxynaphthalene,

2-[2'-{4''-(R-2'''-methyldecyloxycarbonyl)phenyl}ethyl]-6-decyloxynaphthalene,

2-[2'-{4''-(R-2'''-methylbutyloxycarbonyl)phenyl}ethyl]-6-hexyloxynaphthalene,

2-[2'-{4''-(R-2'''-methylbutyloxycarbonyl)phenyl}ethyl]- 6-heptyloxynaphthalene, 2-[2'-{4''-(R-2'''-methylbutyloxycarbonyl)phenyl}ethyl]-6-octyloxynaphthalene, 2-[2'-{4''-(R-2'''-methylbutyloxycarbonyl)phenyl}ethyl]-6-nonyloxynaphthalene, 2-[2'-{4''-(R-2'''-methylbutyloxycarbonyl)phenyl}ethyl]-6-decyloxynaphthalene, 2-[2'-{4''-(R-2'''-methylbutyloxycarbonyl)phenyl}ethyl]-6-undecyloxynaphthalene, 2-[2'-{4''-(R-2'''-methylbutyloxycarbonyl)phenyl}ethyl]-6-dodecyloxynaphthalene, 2-[2'-{4''-(R-2'''-methylbutyloxycarbonyl)phenyl}ethyl]-6-tridecyloxynaphthalene, 2-[2'-{4''-(R-2'''-methylbutyloxycarbonyl)phenyl}ethyl]-6-tetradecyloxynaphthalene, 2-[2'-{4''-(R-2'''-methylbutyloxycarbonyl)phenyl}ethyl]-6-pentadecyloxynaphthalene, 2-[2'-{4''-(R-2'''-methylbutyloxycarbonyl)phenyl}e-
thyl]-6-hexadecyloxynaphthalene,
2-[2'-{4''-(R-2'''-methylbutyloxycarbonyl)phenyl}e-
thyl]-6-heptadecyloxynaphthalene,
2-[2'-{4''-(R-1'''-methylheptyloxycarbonyl)phenyl}e-
thyl]-6-octadecyloxynaphthalene,
2-[2'-{4''-(R-1'''-methylheptyloxycarbonyl)phenyl}e-
thyl]-6-hexyloxynaphthalene,
2-[2'-{4''-methylheptyloxycarbonyl)phenyl}ethyl]-6-
heptyloxynaphthalene,
2-[2'-{4''-(R-1'''-methyloxyheptylcarbonyl)phenyl}e-
thyl]-6-octyloxynaphthalene,
2-[2'-{4''-(R-1'''-methyloxyheptylcarbonyl)phenyl}e-
thyl]-6-nonyloxynaphthalene,
2-[2'-{4''-(R-1'''-methyloxyheptylcarbonyl)phenyl}e-
thyl]-6-decyloxynaphthalene,
2-[2'-{4''-(R-1'''-methyloxyheptylcarbonyl)phenyl}e-
thyl]-6-undecyloxynaphthalene,
2-[2'-{4''-(R-1'''-methyloxyheptylcarbonyl)phenyl}e-
thyl]-6-dodecyloxynaphthalene,
2-[2'-{4''-(R-1'''-methyloxyheptylcarbonyl)phenyl}e-
thyl]-6-tridecyloxynaphthalene,
2-[2'-{4''-(R-1'''-methyloxyheptylcarbonyl)phenyl}e-
thyl]-6-tridecyloxynaphthalene,
2-[2'-{4''-(R-1'''-methyloxyheptylcarbonyl)phenyl}e-
thyl]-6-tetradecyloxynaphthalene,
2-[2'-{4''-(R-1'''-methyloxyheptylcarbonyl)phenyl}e-
thyl]-6-pentadecyloxynaphthalene,
2-[2'-{4''-(R-1'''-methyloxyheptylcarbonyl)phenyl}e-
thyl]-6-hexadecyloxynaphthalene,
2-[2'-{4''-(R-1'''-methylheptyloxycarbonyl)phenyl}e-
thyl]-6-heptadecyloxynaphthalene,
2-[2'-{4''-(R-1'''-methylheptylcarbonyl)phenyl} ethyl]-
6-octadecyloxynaphthalene.

In the present invention, moreover, the liquid crystal compositions containing, besides the compounds of the aforementioned formulas [3] and [5], for example, compounds represented by the following formulas will come to exhibit particularly favorable characteristics.

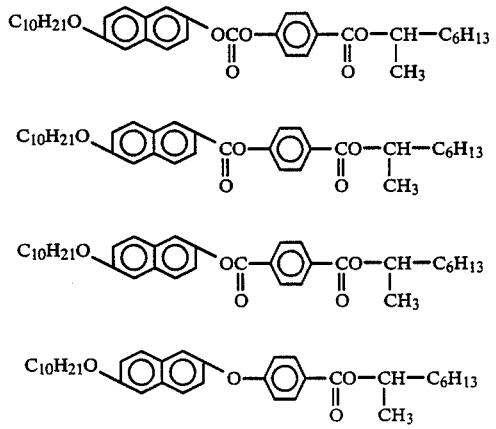

The liquid crystal compositions of the present invention contain the compounds represented by the aforementioned formula [IV], that is, the compounds represented by the formulas [1]–[24] as illustrated above. The present liquid crystal compositions may contain these compounds of the formulas [1]–[24] either singly or in admixture of two or more.

The above-mentioned compounds may be synthesized, for example, by the method, per se, known.

For instance, the compounds of the formula [3] may be prepared by the procedure as mentioned previously.

First, an ester compound having a group corresponding to $R^5$ is prepared in the usual way by reaction of 4-halogenated methyl benzoic acid with alcohol having an optically active carbon such as R-2-methylbutanol or R-1-methylbutanol.

Separately, 2-alkyloxy-6-hydroxynaphthalene or 2-alkyl-6-hydroxynaphthalene having a group corresponding to $R^4$ by alkylation of one of the hydroxyl groups of 2,6-hydroxynaphthalene.

Subsequently, a compound represented by the formula [3] may be obtained by reaction of the above-mentioned ester compound with 2-alkyloxy-6-hydroxynaphthalene or 2-alkyl-6-hydroxynaphthalene.

The compounds represented by the formula [5] may be prepared in the following manner. That is, 6-alkyloxy-2-carboxynaphthalene or 6-alkyl-2-carboxynaphthalene having a group corresponding to $R^4$ prepared in accordance with the above-mentioned procedure is reduced with a reducing agent such as lithiumaluminum hydride to obtain 6-alkyloxy-2-hydroxymethylnaphthalene or 6-alkyl-2-hydroxymethylnaphthalene. This 6-alkyloxy-2-hydroxymethylnaphthalene or 6-alkyl-2-hydroxymethylnaphthalene is oxidized with an oxidizing agent such as activated manganese dioxide to obtain 2-formyl-6-alkyloxy-naphthalene or 2-formyl-6-alkylnaphthalene.

Separately, methyl 4-bromomethylbenzoate carboxylate formed by reaction of p-bromomethyl benzoate with methanol is reacted with triphenylphosphine to obtain (4-methyloxycarbonyl)phenylmethylphosphonium bromide.

This (4-methyloxycarbonyl)phenylmethylphosphonium bromide is reacted with the above-mentioned 2-formyl-6-alkyloxynaphthalene or 2-formyl-6-alkylnaphthalene to obtain 2-[2'-4''-(methyloxycarbonylphenyl)ethenyl]-6-alkoxynaphthalene or 2-[2'-4''-(methyloxycarbonylphenyl)ethenyl]-6-alkylnaphthalene. This compounds obtained are reduced with hydrogen gas or the like in the presence of a reducing agent such as a palladium catalyst to obtain 2-[2'-4''-(methyloxycarbonylphenyl)ethyl]-6-alkoxynaphthalene or 2-[2'-4''-(methyloxycarbonylphenyl)ethyl]-6-alkylnaphthalene, and this naphthalene compounds are then reacted with branched alcohol such as R-2-methylbutanol or R-1-methylheptanol having an alkyl group corresponding to $R^5$ to obtain compounds represented by the formula [5].

Because the substituted naphthalene compounds as illustrated above have in a core portion of the molecule a naphthalene skeleton and a phenyl skeleton, they will come to have such characteristics that the molecule itself has a rigidity to a certain degree, and a cohesive energy of the molecule as the whole is small.

Among the substituted naphthalene compounds illustrated above, there are many compounds which are usable as ferroelectric liquid crystal compounds used in switching elements to control transmission of light, for example, by placing the ferroelectric liquid crystal compound in an electric field or a magnetic field and thereby to change a tilt angle of said ferroelectric liquid crystal compounds. That is, such ferroelectric liquid crystal compositions used as switching elements are required to contain ferroelectric liquid crystal compounds having a smectic C phase in the vicinity of room temperature, and a largeness (Ps) of a spontaneous polarization and a viscosity coefficient at a chiral smectic C phase, both falling within appropriate ranges. Of the substituted naphthalene compounds mentioned above, the compounds assuming a chiral smectic C phase may be used as principal ingredient of chiral smectic liquid crystal compositions used as ferroelectric liquid crystal compositions or as adjuvant of liquid crystal compositions containing other compounds assuming chiral smectic C phase as principal ingredient.

Most typical examples of the compounds as mentioned above are those represented by the following formula [V].

That is, of the compounds synthesized in the manner as mentioned above, the compound represented by the formula [V] has a phase transition point as shown in the following Table 1. In the tables or the like shown hereinafter, C (or Cry) represents a crystal phase, SmA represents a smectic A phase, SmC represents a chiral smectic C phase and Iso represents an isotropic liquid phase. In each phase, the numeral marked with an asterisk represents a transition temperature at which the phase is transformed to the phase shown on the right side.

The compound of the formula [VI] as illustrated above cannot be used as a chiral smectic liquid crystal compound when used singly. However, this compound may be used as a chiral smectic liquid crystal composition, for example, by using it in admixture with a compound showing a chiral smectic phase C out of the compounds represented by the above-mentioned formula [V]. Furthermore, the compound of the formula [VI] may also be used as a nematic liquid crystal composition or cholesteric liquid crystal composition by using it in admixture with a cholesteric liquid crystal compound or nematic liquid crystal compound.

Accordingly, the content in the present liquid crystal composition of the compound of the aforementioned formula [IV] may suitably decided, taking into consideration characteristics of the substituted naphthalene compound used, viscosity coefficient of the composition and purpose for which the composition is used.

In the present liquid crystal compositions, examples of the compound assuming a chiral smectic C phase which can be used, together with the liquid crystal

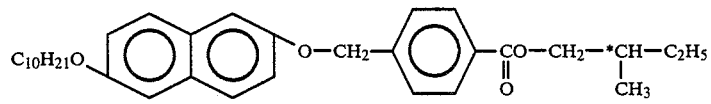

[V]

TABLE 1

| Compound | C | SmC | SmA | Iso |
|---|---|---|---|---|
| [V] | Temperature (1) * | 38° C.* | 47° C.* | 89° C.* |

(1) measured in the course of temperaute dropping.

compound of the formula [IV], in said composition includes (+)-4'-(2''-methylbutyloxy)phenyl-6-octyl-naphthalene-2-carboxylic acid ester, 4'-decyloxyphenyl-6-((+)-2''-methylbutyloxy)naphthalene-2-carboxylic acid ester,

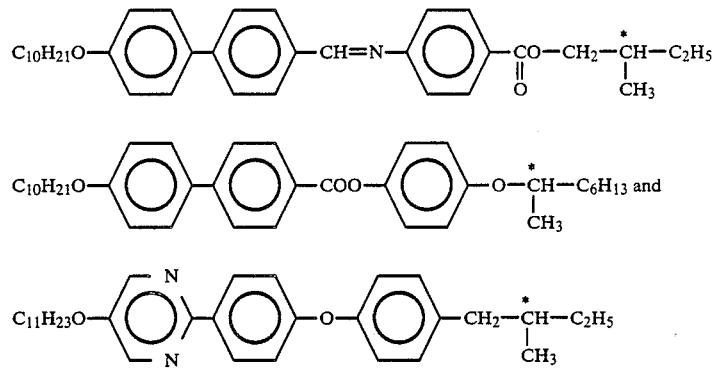

Of the substituted naphthalene compounds mentioned above, the compound, for example, represented by the following formula [VI] does not assume a chiral smectic C phase. The compound of the formula [VI] has a phase transition point as shown in Table 2.

Besides the above-mentioned compounds assuming a chiral smectic C phase, moreover, examples of liquid crystal compounds capable of constituting the present liquid crystal compositions by using them together with the aforementioned substituted naphthalene compounds of the formula [IV] include nematic liquid crystal com-

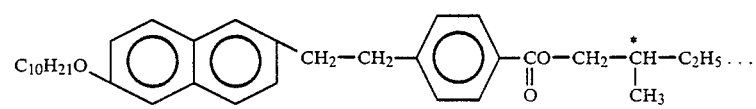

[VI]

TABLE 2

| Compound | C | SmC | SmA | Iso |
|---|---|---|---|---|
| [VI] | Temperature (1) * | — | <0° C.* | 48° C.* |

(1) measured in the course of temperaute dropping.

pounds as typified by Shiff's base type liquid crystal compounds such as

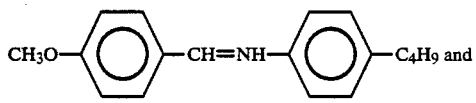

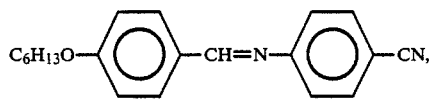

azoxy type liquid crystal compounds such as

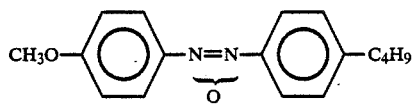

benzoic acid ester type liquid crystal compounds such as

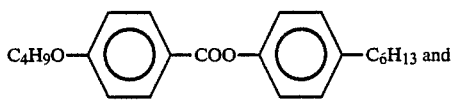

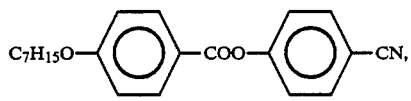

cyclohexylcarboxylic acid ester type liquid crystal compounds such as

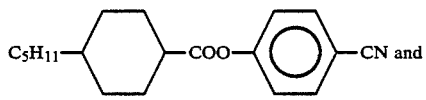

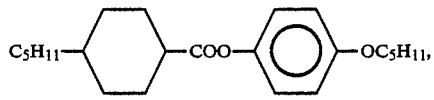

biphenyl type liquid crystal compounds such as

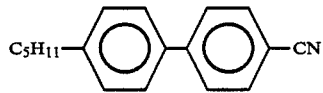

terphenyl type liquid crystal compounds such as

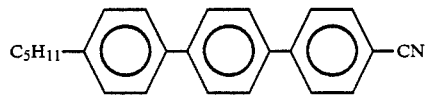

cyclohexyl type liquid crystal compounds such as

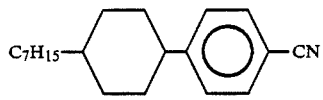

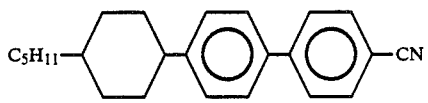

and pyridine type liquid crystal compounds such as

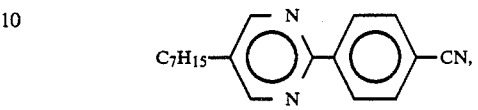

and further include cholesteric type liquid crystal compounds such as hydrocholesteric nonanoic acid cholesterin and oleic acid cholesterin, and known smectic liquid crystal compounds.

The present liquid crystal compositions may contain, for example, additives which can be incorporated into ordinary liquid crystal compositions, such as conductivity imparting agents and lifetime improving agents.

The following methods may be given as examples of the display method in which the present liquid crystal compositions are used.

The first display method is to effect the display by injecting the present liquid crystal composition into a thin film cell having a space, for example, of 2-5 μm, orientating the ferroelectric liquid crystal compound parallel to a substrate by utilization of controlling power of the substrate, placing the thin film cell containing the liquid crystal compound between two polarized plates, and applying an external electric field to the thin film cell to change a orientation vector of the ferroelectric liquid crystal compound, thereby effecting display by utilizing a birefringenee of the two polarized plates and of the ferroelectric liquid crystal compound. In this case, the electrolodes used is preferably those having obliqueincident deposited silica and the like on the surface thereof.

The second display method comprises using a mixture of the present liquid crystal composition and dichroic dyes, and utilizing dichroic properties of the dyes. This method is to effect display by changing light absorption by means of the dye while changing the orientation direction of the ferroelectric liquid crystal composition. In this case, the dyes used are usually dichroic dyes, and examples of the dichroic dyes include azo dyes, naphthoquinone type dyes, cyanine type dyes and anthraquinone type dyes.

The present liquid crystal compositions may be applicable to commonly used display methods, in addition to the above-mentioned display methods.

The display devices prepared by using the present liquid crystal compositions may be driven by various driving methods, for example, electric address display such as static drive, simple matrix drive and composite matrix drive, photo-address display, heat address display and electron beam display.

According to the display method using the present liquid crystal composition containing a substituted naphthalene compound assuming a chiral smectic phase at ordinary temperature (room temperature) out of the present liquid crystal compositions as illustrated above, a high speed response of less than scores of μ seconds can be attained, because this quiral smectic liquid crystal composition has a valve of spontaneous polarization at this quiral smectic phase and a viscosity coefficient falling within very favorable ranges. Accordingly, by using this chiral smectic liquid crystal composition as switching elements of a large frame display device having a number of scanning lines, a large frame display having a clear contrast can be obtained, because the time required for each scanning line is short.

Furthermore, when a thin film cell is prepared, into which the chiral smectic liquid crystal composition is injected, and a chiral smectic phase is formed within said cell, whereupon the cell come to have a memory effect, because the liquid crystal compound has a spontaneous polarization in the cell. By utilizing this memory effect, the electric power consumption of the display device can be reduced, because no continuous application of voltage is required. In this case, moreover, a very clear contrast may be obtained.

The switching elements using this chiral smectic liquid crystal composition can be driven at low voltage, because switching can be performed only by changing the direction of molecular orientation of the chiral smectic liquid crystal compound and also because the primary strength of electric field applied is applied to the driving.

In this way, by using the chiral smectic liquid crystal composition out of the present liquid crystal compositions as illustrated hereinbefore, a display device having a small electric power consumption and a clear contrast, though the device is of a large frame, can be prepared.

Furthermore, this quiral smectic liquid crystal composition of the present invention is highly useful as switching elements for display devices for moving picture, because the composition requires a short driving time and a low driving voltage.

On the one hand, the present liquid crystal compositions containing substituted naphthalene compounds which does not assume a chiral smectic C phase may be used as nematic liquid crystal, cholesteric liquid crystal and smectic liquid crystal.

Using even such liquid crystal composition of the present invention as mentioned above, which contain the substituted naphthalene compounds assuming no chiral smectic C phase, liquid crystal elements excellent in characteristics such as driving time, driving voltage and sharpness, as compared with the use of conventional liquid crystal compositions.

The present invention is illustrated below in more detail with reference to examples, but it should be construed that the invention is in no way limited to those examples.

EXAMPLE 1 [Synthesis of liquid crystal compound]

Preparation of
2-[4'(R-2''-methylbutyloxycarbony)phenylmethyloxy]-6-decyloxynaphthalene First Step A mixture comprising 13.6 g (100 mmol) of 4-methylbenzoic acid, 17.8 g (100 mmol) of N-bromosuccinimide and 1 g of benzoyl peroxide was refluxed for 2 hours in 125 ml of carbon tetrachloride, followed by cooling. The reaction product was then collected by filtration.

Recrystallization of then reaction product from methanol gave 14.6 g of 4-bromomethylbenzoic acid.

Second Step

Into 40 ml of benzene were placed 1.08 g (5 mmol) of the 4-bromomethylbenzoic acid obtained in the first step, 0.61 ml (5.5 mmol) of R-2-methylbutanol and 0.1 ml of concentrated sulfuric acid, and the mixture was refluxed for 25 hours.

After cooling, the reaction product was extracted with ether, and the extract was washed with aqueous sodium hydrogencarbonate solution followed by water-washing.

After water-washing, the extract was concentrated and subjected to colum chromeatography to obtain 0.8 g of R-2'-methylbutyl-(4-bromomethyl) benzoate.

Third Step

To a mixture comprising 0.66 g of 85% KOH, 40 ml of ethanol and 0.2 ml of water were added 3.2 g (20 mmol) of 2,6-dihydroxynaphthalene and 3.12 g (10 mmol) of decyl tosylate, followed by stirring at 90° C. for 15 hours.

Subsequently, the reaction liquid is poured into water and neutralized with hydrochloric acid.

After neutralization, the reaction product was extracted with ether, and the extract liquid is washed with water, followed by concentration.

Using column chromatography, 1.6 g of 2-decyloxy-6-hydroxynaphthalene was separated from the concentrated mixture.

Fourth Step

To 10 ml of dimethylformamide (DMF) were added 0.6 g (2 mmol) of the 2-decyloxy-6-hydroxynaphthalene obtained in the third step, 0.63 g (2.2 mmol) of the R-2'-methylbutyl-(4-bromomethyl) benzoate obtained in the second step and 0.28 g (2 mmol) of calcium carbonate, and the mixture was stirred at 100° C. for 12 hours and the reaction mixture was chilled into water.

Subsequently, the reaction product was extracted with ether, washed with water and then concentrated.

From this concentrated liquid, the reaction product was separated by means of column chromatograpy. Recrystallization from hexane gave 0.27 g of white needles.

The white needles was assayed and identified to be 2-[4'(R-2''-methylbutyloxycarbonyl)phenylmethyloxy]-6-decyloxynaphthalene. Melting point: 89° C.

FIG. 1 shows a chart of $^1$H-NMR spectrum (270 MHz, CDCl$_3$) of the compound obtained.

As is clear from FIG. 1, this compound showed a specific pack as mentioned below δ(PPM) 0.9–1.0 (m, 9H, —CH$_3$), 1.3–1.8 (m, 21H), 4.0–4.2 (m, 4H), 7.1–8.1 (m, 10H, araomatic).

Further, this compound had a value of mass spectrum of MS;M/e=504(P).

It was confirmed that this compound has a smectic C phase in the range of 38°–47° C.

A phase transition temperature of this compound is shown below.

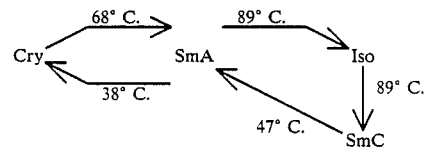

In the above, Cry represents a crystal phase, SmA represens a smectic A phase, SmC represents a chiral smectic C phase, Iso represents an isotropic liquid, and the temperature described represents a phase transition temperature toward the direction of an arrow.

EXAMPLE 2 [Synthesis of liquid crystal compound]

Preparation of 2-[2'-{4"-(R-2'"-methylbutyloxycarbonylphenyl)}ethyl]-6-decyloxynaphthalene

First Step

To a mixture comprising 0.66 g of 85% KOH, 40 ml of ethanol and 0.2 ml of water were added 3.76 g (20 mmol) of 2-carboxy-6-hydroxynaphthalene and 3.12 g (10 mmol) of decyl tosylate, and the mixture was stirred at 90° C. for 15 hours.

Subsequently, this reaction liquid is poured into water and neutralization with hydrochloric acid.

After neutralization, the reaction product was extracted with ether, the extract liquid was washed with water and concentrated.

Using column chromatography, from this concentrated liquid, 1.6 g of 6-decyloxy-2-carboxynapthalene was separated.

Second Step

In an anhydrous tetrahydrofuran (THF), 1.0 g (26.4 mmol) lithiumaluminum hydride was reacted with 1.348 g (4.1 mmol) of the 6-decyloxy-2-carboxynaphthalene obtained in the first step in an argon atmosphere at room temperature for 2 hours, and further reacted under reflux with heating for 1 hour.

After cooling, the reaction was diluted with 150 ml of ether, and then excess lithiumaluminum hydride was decomposed by the addition with saturated $Na_2SO_4$ water to stop the reaction.

The decomposed lithiumaluminum hydride was removed by filtration, and the filtrate was dried over anhydrous $Na_2SO_4$, followed by removal of the ether.

The residue obtained by removal of the ether was recrystallized from a mixed solvent of hexane and ethyl acetate (mixing volume ratio = 10:1) to obtain 1.078 g of 6-decyloxy-2-hydroxynaphthalene. Yield: 85.8%.

Third Step

In chloroform, 84 mg (0.43 mmol) or the 6-decyloxy-2-hydroxymethylnaphthalene and 235 mg (2.57 mmol) of activated manganese dioxide were stirred at room temperature for 12 hours.

The rection solution was filtered, and the filtrate was concentrated. The crude product obtained was purified by means of silica gel thin layer chromatography to obtain 72.2 mg of 2-formyl-6-decyloxynaphthalene as white needles.

Fourth Step

In the usual way, methyl 4-bromomethylbenzoate was obtained by reaction of p-bromomethylbenzoic acid with methanol in the presence of an acid catalyst. In benzene, 2.61 g (11.4 mmol) of methyl 4-bromomethylbenzoate carboxylate obtained above and 3.0 g (11.4 mmol) of triphenyl phospine were heated under reflux to undergo reaction. After cooling the crystals formed were collected by filtration, Recrystallization of the crystals from benzene gave 3.43 g of (4-methyloxycarbonyl)phenylmethylphosphonyl bromide as white needles.

Fifth Step

In methylene chloride were dissolved 475 mg (2.47 mmol) of 2-formyl-6-decyloxynaphthalene and 1215 mg (25 mmol) of the (4-methyloxycarbonyl)phenylmethylphosphonyl bromide obtained the fourth step.

To this solution was added dropwise an aqueous potassium hydroxide solution, and after the completion of the reaction, the reaction liquid was concentrated.

This concentrate was purified by means of silica gel thin layer chromatography to obtain 519 mg (1.7 mmol) of 2-[2'-(4-methyloxycarbonylphenyl)ethenyl]-6-decyloxynaphthalene as a mixture of cis form and trans form.

Sixth Step

To ethanol were added 519 mg (1.7 mmol) of the 2-[2'-4"-methyloxycarbonylphenyl)ethenyl]-6-decyloxynaphthalene obtained in the fifth step and 52 mg of palladium carbon catalyst (palladium content: 5% by weight), followed by bubbling with hydrogen gas at room temperature for 5 hours.

Subsequently, the reaction liquid was filtered, and the filtrate was concentrated. Separation of the concentrated reaction liquid by means of column chromatography gave 492 mg (1.1 mmol) of 2-[2'-(4"-methyloxycarbonylphenyl)ethyl]-6-decyloxynaphthalene.

Seventh Step

To 40 ml of benzene were added 492 mg (1.1 mmol) of the 2-[2'-(4"-methyloxycabonylphenyl)ethyl]-6-decyloxynaphthalene obtained in the sixth step, 0.61 ml (8.5 mmol) of R-2-methylbutanol and 0.1 ml of t-butoxycalcium, and this reaction liquid was refluxed for 25 hours to undergo reaction. After cooling, the reaction product was extracted with ether.

The extract was washed with an aqueous sodium hydrogencarbonate solution and further with water, and then concentrated.

The concentrate obtained was subjected to separation by means of column chromatography obtain 485 mg of white solid powder.

This crystals were assayed and confirmed to be 2-[2'-{4"-(R-2'"-methylbutyloxycarbonyl)phenyl}ethyl]-6-decyloxynaphthalene. Melting point: 48° C.

Figure 2:
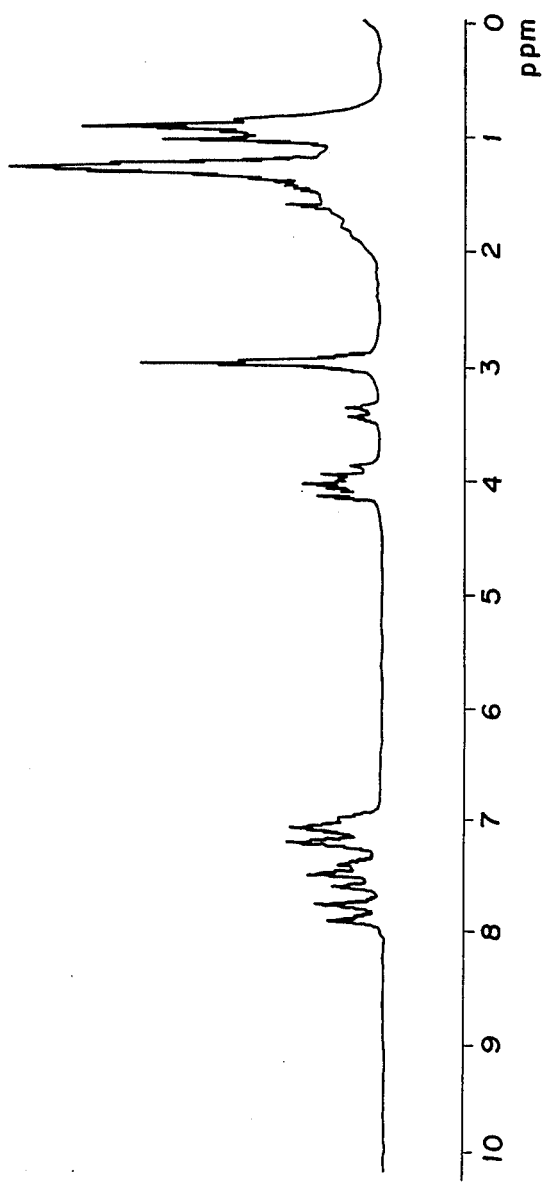
FIG. 2 is a chart showing $^1$H-NMR spectrum of 2-[2'-{4''-(R-2'''-methylbutyloxycarbonyl}ethyl]-6-decyloxynaphthalene.

FIG. 2 shows a chart of $^1$H-NMR spectrum (270 MHz, CDCl) of the compound obtained.

As is clear from FIG. 2, this compound showed a specific pack as mentioned below.

δ(PPM) 0.7-1.0 (m, 9H, —CH$_3$), 1.1-1.8 (m, 21H), 3.3 (d, 2H), 3.7-4.1 (m, 4H), 6.9-7.9 (m, 10H, aromatic).

Furthermore, a value of mass spectrum of this compound was MS;M/e=502(P).

It was confirmed that this compound has a smectic A phase in the range of 0°-48° C.

A phase transition temperature of this compound is shown below.

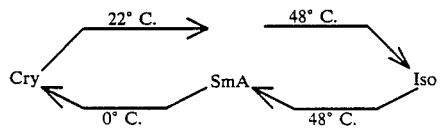

EXAMPLE 3

A liquid crystal cell was prepared in the following manner. Polyimide coating was conducted on a glass substrate provided with ITO transparent electrode film. That is, the polyimide (PIQ-5400, a product of Hitachi Kasei Kogyo kk) was coated on the ITO transparent electrode by spin coating method. The polyimide was diluted with N-methylpyrrolidone to a 1.2% solution which was then spin-coated at 2000 rpm. The polyimide solution thus coated was cured by heating at 325° C. for 30 minutes, whereupon a polyimide film of 150 to 200 Å in thickness was formed. The polyimide film was then rubbed with a nylon cloth in one direction, thereby imparting an ability or orientating the liquid crystal thereto.

Two sheets of the thus-prepared polyimide film-coated glass substrates were put upon each other to prepare a cell for evaluation. An epoxy adhesive was applied to one of the polyimide film-coated glass substrates by means of silk screen printing so that two sheets of the substrates bond to each other and a gap of the cell is controlled. The epoxy adhesive used was prepared by mixing an adhesive base (LCB, a product of EHC) with a curing agent (LCB-304B, a product of EHC) and beads for controlling cell gap (GP-20, a product of EHC) in the proportion of 138:30:3. One of the two sheets of the glass substrates mentioned above was coated with the epoxy adhesive and laminated to the other glass substrate in such a manner that the polyimide films face each other.

The adhesive thus coated was cured under such curing conditions that heating was conducted at 50° C. for 15 minutes, at 60° C. for 15 minutes, at 70° C. for 15 minutes, at 80° C. for 15 minutes, at 125° C. for 30 minutes and at 170° C. for 60 minutes.

The thus prepared cell having a gap of about 2 μm was interposed between two sheets of polarizing plates so arranged that polarizing directions were at right angles to each other.

After charging the cell thus prepared with a liquid crystal compound,

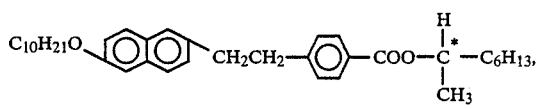

the liquid crystal cell was heatd to 50° C. to bring the liquid crystal compound to a liquid state. The liquid crystal cell was gradually cooled at a cooling rate of about 1° C./min by temperature gradient method, whereby good initial orientation was obtained.

When an electric field was applied to the cell in smectic A phase, there could be observed induced tilt (change in the orientation direction of the major axis of the molecule). At 0° C., there were obtained a light (ON) state at +30 V and a dark (OFF) state at −30 V. The contrasft of brightness between the light state and the dark state was 4. Optical response time measured at 0° C. was 52 μ seconds.

Thus, there could be formed the display device having excellent characteristics by virtue of using the substituted naphthalene compound as mentioned above.

EXAMPLE 4

A liquid crystal cell having a gap of about 2 m, prepared in the same way as in Example 3 was interposed between two sheets of polarizing plates arranged so that polarizing directions were at right angles to each other.

The liquid crystal cell was charged with a liquid crystal composition comprising a mixture of 43 parts by weight of a liquid crystal A

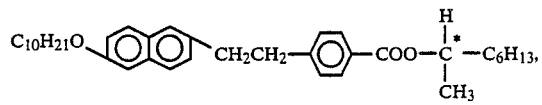

and 57 parts by weight of a liquid crystal B

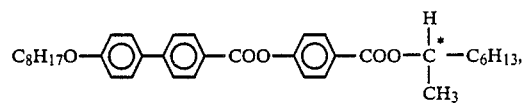

both liquid crystals being compounds of the present invention. The mixture exhibited the following liquid crystal phase.

| | | C | | SmA | | Iso |
|---|---|---|---|---|---|---|
| Liquid crystal | Temperature (1) | * | −30 | * | 62 | * |

(1) measured in the course of temperaute dropping.

The liquid crystal cell was heated to 70° C. to bring the compounds into a liquid state. The cell was then gradually cooled at a cooling rate of 1° C./min by temperature gradient method, whereby good initial orientation could be obtained.

When an electric field was applied to the liquid crystal cell in a state of smectic A phase, there could be observed induced tilt (change in the orientation direction of the major axis of the molecule). At 0° C., there were obtained a light (ON) state at +30 V and a dark (OFF) state at −30 V. The contrast of the brightness of the light state and the dark state was 5. Optical response time at 0° C. was 520 μ seconds.

Thus, there could be formed a display device having excellent characteristics by virtue of using the substituted naphthalene compound as mentioned above.

The temperature range of the liquid crystal B was as follows.

| | | C | | SmC | | SmA | | Iso |
|---|---|---|---|---|---|---|---|---|
| Liquid crystal B | Temperature (1) | * | 73 | * | 122 | * | 150 | * |

(1) measured in the course of temperaute dropping.

EXAMPLE 5

One sheet of a polarizing plate was placed on the outer side of a liquid crystal cell having a gap of about 2 μm, prepared in the same way as in Example 3.

The liquid crystal cell was charged with a liquid crystal compound comprising a mixture of of 99 parts by weight of the liquid crystal A of the present invention

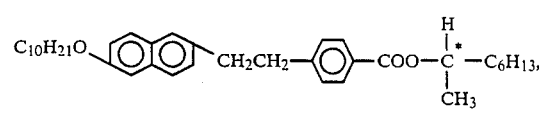

and one part by weight of a dichroic dye of the following structure formula.

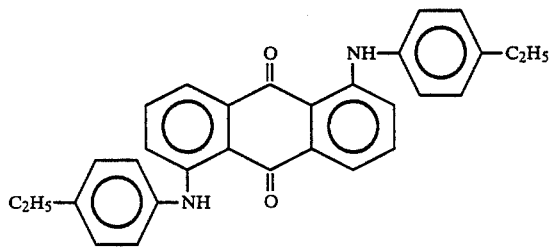

The liquid crystal cell was heated to 50° C. to bring the compounds to a liquid state. The cell was then gradually cooled at a cooling rate of about 1° C./min, whereby good initial orientation could be obtained.

When an electric field was applied to the liquid crystal cell in a state of smectic A phase, there could be observed induced tilt (change in the orientation direction of the major axis of the molecule). The dichroic dye caused also change in direction of the major axis of the molecule with the induced tilt of the liquid crystal. At 0° C., there were obtained a light (ON) state at +30 V and a dark (OFF) state at −30 V. The contrast of the brightness of the light state and the dark state was 4. Optical response time measured at 0° C. was 780 μ seconds.

Thus, there could be formed a display device having excellent characteristics by virtue of using the liquid crystal composition containing the substituted naphthalene compound as mentioned above.

What is claimed is:

1. A substituted naphthalene compound having the following formula [I].

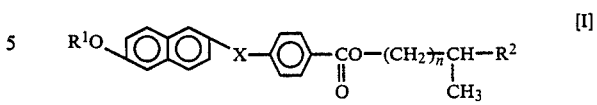

wherein $R^1$ represents alkyl of 1-18 carbon atoms, $R^2$ represents alkyl of 1-18 carbon atoms, X is a group represented by —$OCH_2$— or —$CH_2CH_2$—, and n is 0 or 1.

2. A substituted naphthalene compounds having the formula [I] as set forth in claim 1 in which $R^2$ is alkyl of 2 or more carbon atoms, said substituted naphthalene compounds being represented by the following formula [II].

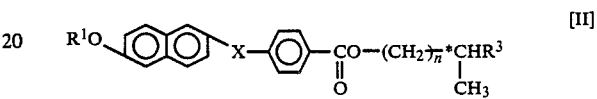

wherein $R^1$ represents alkyl of 1-18 carbon atoms, $R^3$ represents alkyl of 2-18 carbon atoms, X is a group represented by —$OCH_2$— or $CH_2CH_2$—, n is 0 or 1, and *C is an optically active carbon.

3. The substituted naphthalene compound of the formula [II] as claimed in claim 2 wherein n is 1, $R^3$ is ethyl, $R^1$ is decyl, and X is the group —$OCH_2$—.

4. The substituted naphthalene compounds of the formula [II] as claimed in claim 2, wherein n is 1, $R_3$ is ethyl, $R^1$ is decyl, and X is the group—$CH_2CH_2$—.

* * * * *